June 17, 1969     B. P. COMPTON     3,449,974
TOGGLE DRIVE ACTUATOR

Filed June 2, 1967

INVENTOR
BILLY P. COMPTON

June 17, 1969     B. P. COMPTON     3,449,974
TOGGLE DRIVE ACTUATOR
Filed June 2, 1967     Sheet 2 of 2
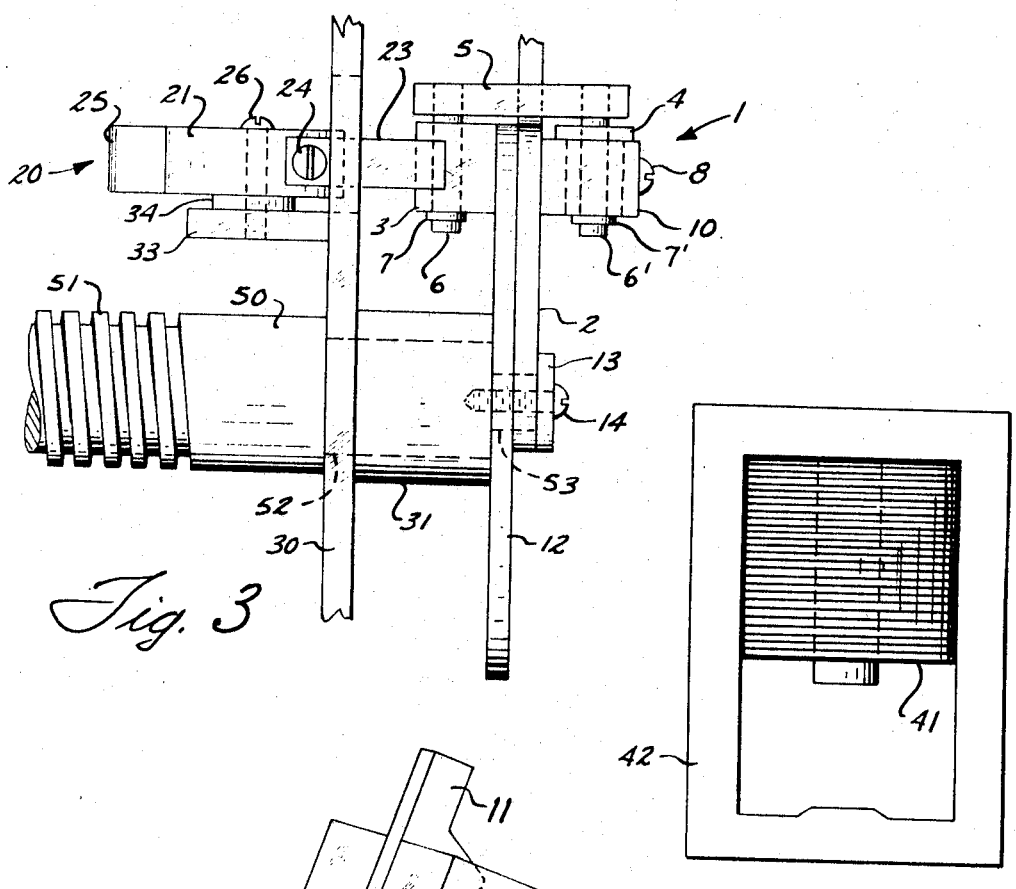
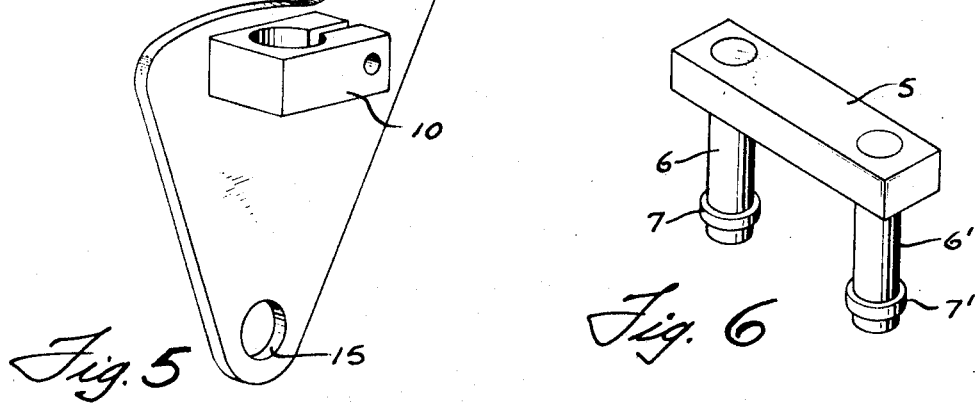

United States Patent Office 3,449,974
Patented June 17, 1969

3,449,974
TOGGLE DRIVE ACTUATOR
Billy P. Compton, 1000 W. 55th St. S.,
Wichita, Kans. 67217
Filed June 2, 1967, Ser. No. 644,758
Int. Cl. F16h 27/02
U.S. Cl. 74—142           4 Claims

ABSTRACT OF THE DISCLOSURE

This disclosure describes a rotary actuator which comprises a disk attached to an output shaft and is torqued by intermittent gripping action of a drive bracket and pressure block interconnected by a toggle. The drive bracket is oscillated through on arc segment to provide the power source input. A set (2) of springs are provided to direct and control the gripping action of the pressure block to provide bi-directional torque output.

---

This invention relates to a rotary actuator and more particularly to a motor which imparts intermittent torque and is bi-directional in operation.

The object of this invention is to provide a simple, economical, low-velocity, high-torque actuator which will utilize oscillatory and/or reciprocative force input and be easily reversed without dismantling the machine.

Another object of this invention is to provide a practical machine for effecting rotory motion to apply high torque force which is easily reversible.

Other objects and advantages of this invention will be in part evident to those skilled in the art and in part pointed out hereinafter in connection with the accompanying drawing wherein there is shown by way of illustration and not of limitation preferred embodiments thereof.

FIG. 3 is a side view illustrating the toggle drive, control, and output.

FIG. 4 is a plan view of the power unit minus the controlling parts.

FIG. 5 is a perspective view of the drive bracket primarily illustrating the armature.

FIG. 6 is a perspective view of the toggle used in the drive.

Figure 1:
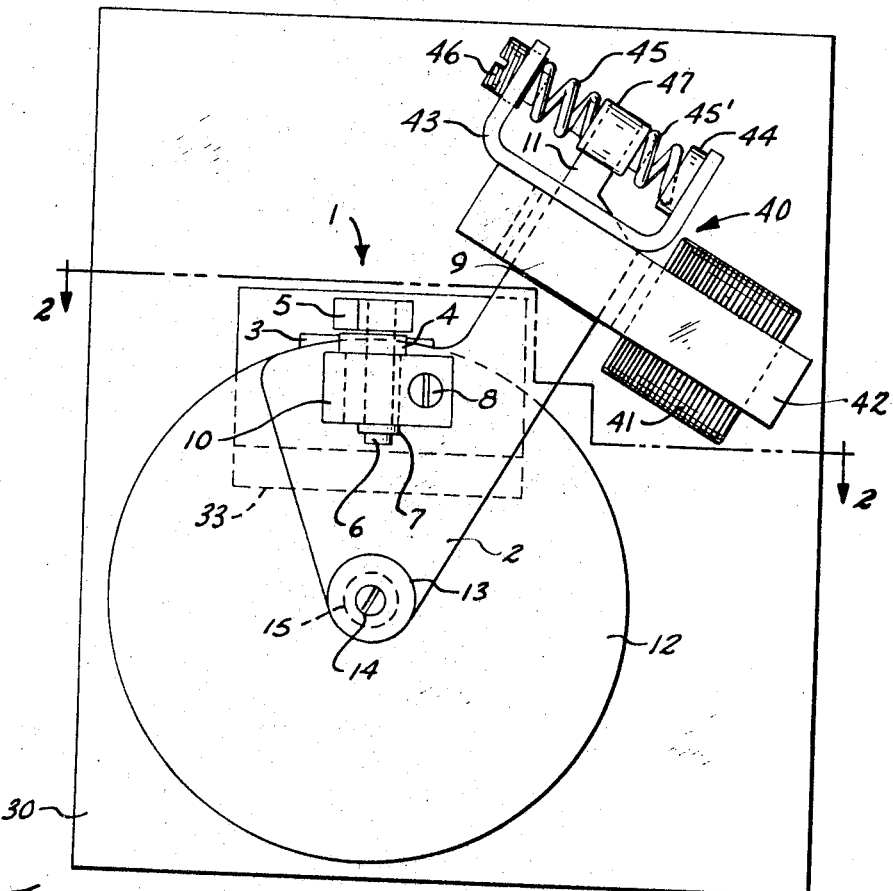
FIG. 1 is an end view of the invention illustrating the power device employed and the drive.

In the embodiment selected to illustrate the principles of this invention a reciprocative motion is supplied (FIG. 1) to the drive bracket 2 by the power unit 40 attached to base plate 30 (attachment not illustrated) which is composed of an electrical coil 41 and an iron core 42. A reversing voltage is applied to the electrical coil 41 to produce a varying flux field in the iron core 42. This causes the armature 9, best shown in FIG. 5, to oscillate. The drive bracket 2 along with armature 9, is oscillated about land 53 fastened to output shaft 50 shown in FIG. 3. Other parts of the power unit are provided to aid in sustaining oscillatory motion of the armature 9 and drive bracket 2. They are shown and herein listed: bracket 43, cup 44, motor springs 45 and 45', power-adjust screw 46, and retainer block 47. Control of the oscillation and displacement are effected by rotation of the power-adjust screw 46. Interconnect is provided by extension 11 of the drive bracket 2 inserted in the retainer block 47.

The drive bracket 2 is mounted loosely to land 53 on the output shaft 50 by washer 13 and screw 14. The arrangement restricts the drive bracket 2 axially and allows the drive bracket 2 to oscillate about land 53 along side a concentric disk 12 which is pressed on the output shaft 50 at land 53 as shown in FIG. 3. This results in fixing the disk 12 to the output shaft 50.

Opposite disk 12 (FIG. 2) from drive bracket 2 is mounted pressure block 3 which is connected to the drive bracket 2 by toggle 5 and toggle pins 6 and 6' (FIG. 6). Plan view (FIG. 2) and side view (FIG. 3) show one end of toggle 5 attached to pressure block 3 by toggle pin 6 and affixed by retaining ring 7. The opposite end of the toggle 5 is attached to the drive bracket 2 by toggle pin 6' through eccentric 4 mounted in extension 10 of the drive bracket 2 and affixed by retaining ring 7'. The eccentric 4 is secured in the extension 10 by clamping screw 8. This essentially describes the toggle drive 1 part of this invention.

Figure 2:
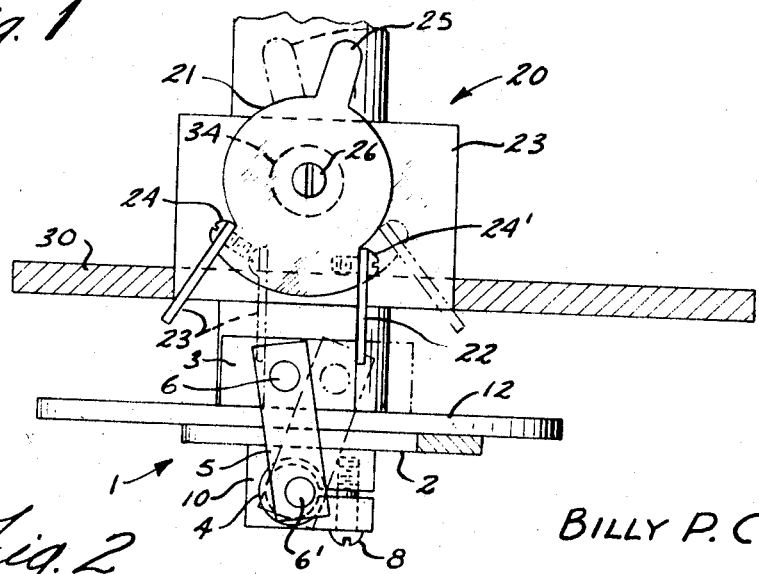
FIG. 2 is a sectional view along line 2—2 of FIG. 1 showing the plan view of the toggle drive and control.

The control 20, best illustrated in FIG. 2, is made up of control block 21 to which springs 22 and 23 are attached by screws 24 and 24'. Tab 25 is a part of control block 21 and is provided to adjust the control 20. The control block 21 is mounted in such a manner that springs 22 and 23 straddle pressure block 3. Control block 21 is secured by screw 26 to boss 34 and extension 33 of base plate 30. Supplementary illustration to the control 20 layout and attachment may be observed in FIG. 3.

The base plate 30 among other parts previously described has a boss 31 (FIG. 3) which provides the attachment and bearing for output shaft 50 at land 52. Take-up thrust for axial forces applied to the output shaft 50 by worm (screw) 51 are provided by the shoulder of land 52 on shaft 50 and disk 12 pressed on land 53 and abutting land 52.

Oscillation of the drive bracket 2 by the power unit 40 results in the end of toggle 5 attached to extension 10 being oscillated circumferentially about disk 12 to describe a short arc segment. The period and amplitude of the oscillation are dictated by the frequency of voltage reversal and displacement control as previously described. Pressure block 3 attached to the opposite end of toggle 5 is restricted from free movement by spring 22 (FIG. 2) and the toggle 5. As the drive bracket 2 is driven to the right the pressure block 3 is forced to the left by spring 22 and the action causes the toggle 5 to pull the pressure block 3 toward the disk 12. This causes the disk 12 to be clamped between the pressure block 3 and the drive bracket 2 resulting in the disk 12 being rotated in the clockwise direction. As the drive bracket 2 is driven to the left the toggle 5 end attached to the eccentric 4 is similarly moved. This action results in the toggle 5 forcing the pressure block 3 away from the disk 12 and relieving the clamping action. Subsequently the spring 22 forces the pressure block 3 to the left. The result is alternate clamping and releasing of the disk 12 by the pressure block 3 and ensuing intermittent clockwise rotation of disk 12 and output shaft 50. Conversely, when the tab 25 is repositioned to the left the control 20 assumes the superimposed position illustrated in FIG. 2. The illustration shows spring 23 being pressed against pressure block 3 forcing the pressure block 3 to the right. This configuration reverses the clamping-releasing action on the disk 12 by the toggle 5 and pressure block 3 resulting in intermittent counterclockwise rotation of disk 12 and output shaft 50.

From the illustration (FIG. 2) it can be seen that the toggle 5 will provide better clamping action when it is positioned close to a normal configuration with the disk 12. It must be noted that the toggle 5 cannot be positioned normal to the disk 12 during clamping as this would result in wedging the disk 12 between the pressure block 3 and the drive bracket 2 thus defeating the purpose of the machine. To account for part variations and wear which will occur the eccentric 4 is mounted in the extension 10 of the drive bracket 2 and secured by clamping screw 8. Adjustment of the toggle 5 is effected by rotating the eccentric 4. This results in moving the affixed toggle pin 6 to or from the disk 12 in such manner as to vary the toggle 5 from a normal position with disk 12 and obtaining an optimum clamping factor.

The design presented is but one specific embodiment of this invention and is herein shown and described; it is to be understood that details of the construction shown may be altered or omitted without departing from the spirit of this invention as defined by the following claims.

What is claimed is:

1. A bi-directional rotary output apparatus comprising a driven member,
a drive member mounted adjacent said driven member on one side thereof,
pressure means mounted on the opposite lateral side of said driven member from said drive member, and
coupling means linking said drive member and said pressure means,
whereby movement of said drive member actuates said coupling means to clamp said driven member between said drive member and said pressure means to move therewith and produce rotation.

2. A bi-directional rotary output apparatus comprising an output shaft,
a driven member fixedly mounted on said output shaft to turn therewith,
a drive member mounted adjacent said driven member on one side thereof,
pressure means mounted on the opposite lateral side of said driven member from said drive member,
toggle means coupling together said drive member and said pressure means, and
means to impart reciprocative movement to said drive member,
whereby movement of said drive member actuates said toggle means to clamp said driven member between said drive member and said pressure means to move therewith and produce rotation of said output shaft.

3. The combination according to claim 2 comprising spring means mounted for selective engagement with said pressure means,
whereby said driven member will be clamped between said drive member and said pressure means in only one direction of motion of said drive member.

4. The combination according to claim 3 comprising control means connected to said spring means,
whereby said spring means may be positioned selectively in one of two positions to produce bi-directional motion.

References Cited

UNITED STATES PATENTS

| | | | |
|---|---|---|---|
| 1,577,460 | 3/1926 | Franca | 310—23 |
| 2,518,177 | 8/1950 | Pulsford | 74—148 |
| 3,213,707 | 10/1965 | McCann et al. | 74—520 |

FOREIGN PATENTS

| | | |
|---|---|---|
| 18,880 | 8/1894 | Great Britain. |

FRED C. MATTERN, Jr., *Primary Examiner.*

W. S. RATLIFF, Jr., *Assistant Examiner.*

U.S. Cl. X.R.

310—23